United States Patent
Lu (10) Patent No.: US 6,581,893 B1
(45) Date of Patent: Jun. 24, 2003

(54) STAND FOR AN LCD MONITOR

(75) Inventor: Sheng-Nan Lu, Taipei Hsien (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/234,133

(22) Filed: Sep. 5, 2002

(51) Int. Cl.$^7$ ................................................. E04G 3/00
(52) U.S. Cl. ............... 248/291.1; 248/919; 248/292.13; 248/371; 248/923; 361/681; 16/340; 16/337
(58) Field of Search .................. 248/291.1, 122.1, 248/371, 397, 424, 917, 919, 920, 922, 923, 292.12, 398, 130, 133, 185.1, 292.13, 921; 16/340, 337; 361/681, 682, 683; E04G 3/00

(56) References Cited

U.S. PATENT DOCUMENTS

| | | | | |
|---|---|---|---|---|
| 4,976,007 A | * | 12/1990 | Lam ........................... | 16/302 |
| 5,022,778 A | * | 6/1991 | Lu ............................. | 403/120 |
| 5,109,570 A | * | 5/1992 | Okada et al. ................ | 16/289 |
| 5,208,944 A | * | 5/1993 | Lu ............................. | 16/278 |
| 5,239,731 A | * | 8/1993 | Lu ............................. | 16/340 |
| 5,269,047 A | * | 12/1993 | Lu ............................. | 16/340 |
| 5,335,142 A | * | 8/1994 | Anderson .................... | 361/681 |
| 5,702,197 A | * | 12/1997 | Chen .......................... | 403/166 |
| 5,772,351 A | * | 6/1998 | Ching ......................... | 403/111 |
| 5,812,368 A | * | 9/1998 | Chen et al. ................. | 361/681 |
| 5,894,633 A | * | 4/1999 | Kaneko ....................... | 16/306 |
| 5,913,351 A | * | 6/1999 | Miura ......................... | 16/340 |
| 5,970,580 A | * | 10/1999 | Katoh ......................... | 16/337 |
| 6,018,847 A | * | 2/2000 | Lu ............................. | 16/337 |
| 6,081,969 A | * | 7/2000 | Tanahashi et al. ........... | 16/337 |
| 6,108,868 A | * | 8/2000 | Lin ............................. | 16/340 |
| 6,163,928 A | * | 12/2000 | Chung ........................ | 16/342 |
| 6,231,021 B1 | * | 5/2001 | Hong .......................... | 248/371 |
| 6,253,419 B1 | * | 7/2001 | Lu ............................. | 16/340 |
| 6,286,187 B1 | * | 9/2001 | Chang ........................ | 16/340 |
| 6,453,509 B1 | * | 9/2002 | Shin ........................... | 16/340 |
| 6,481,057 B2 | * | 11/2002 | Lin ............................. | 16/340 |
| 6,484,994 B2 | * | 11/2002 | Hokugoh .................... | 248/371 |
| 6,502,792 B1 | * | 1/2003 | Cho et al. .................. | 248/121 |
| 6,522,530 B2 | * | 2/2003 | Bang .......................... | 361/681 |

FOREIGN PATENT DOCUMENTS

EP        1085397 A2   *   3/2001

* cited by examiner

Primary Examiner—Anita King
Assistant Examiner—Naschica S. Morrison
(74) Attorney, Agent, or Firm—Jones, Tullar & Cooper, P.C.

(57) ABSTRACT

A stand for an LCD monitor with a back is composed of a locking member, a first pivoting member, a second pivoting member, a monitor bracket, a base and two base brackets. The monitor bracket is attached to the back of the LCD monitor. The pivoting members are securely attached to the base brackets on the base. The monitor bracket can be pivoted relative to the base by using the pivoting members, so that the LCD monitor is folded to reduce its overall volume for packing, storing or transporting.

5 Claims, 11 Drawing Sheets

STAND FOR AN LCD MONITOR

BACKGROUND OF THE INVENTION

1. Field of the Invention

The present invention is related to a stand, and more particularly to a stand for an LCD monitor.

2. Description of Related Art

Figure 11:
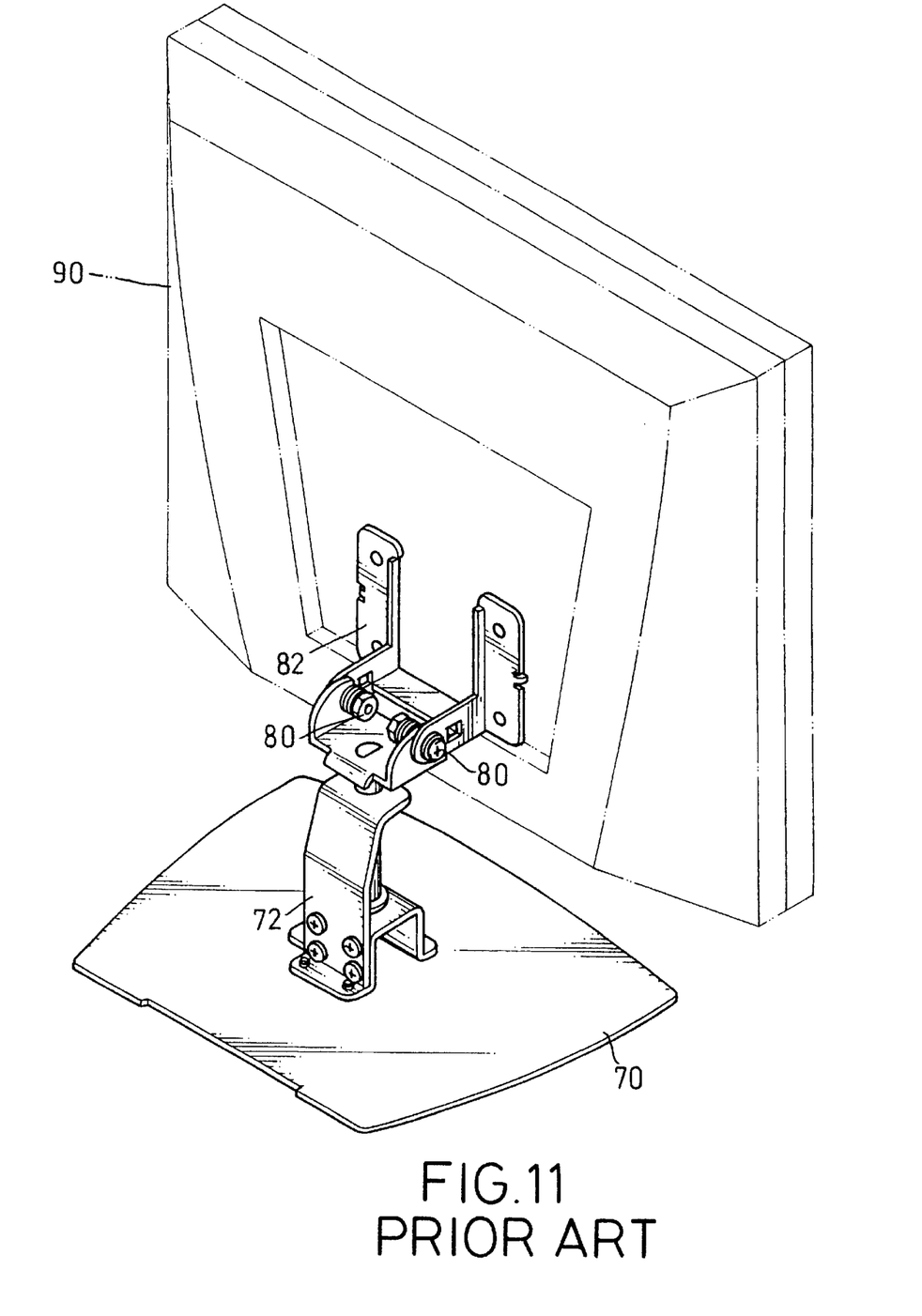
FIG. 11 is a perspective view of a conventional stand for an LCD monitor.

With reference to FIG. 11, a conventional stand for an LCD monitor (90) has a base (70), a seat (72) and a monitor bracket (82). The seat (72) has a bottom and a top and is connected to and extends up from the base (70). The monitor bracket (82) is pivotally connected to the top of the seat (72) by two pivot pins (80). The LCD monitor (90) is attached to the monitor bracket (82) and can be pivoted on the seat (72) to adjust the angle through a range of angles.

However, the range of adjustable angles of the monitor bracket (82) is limited, so that the LCD monitor cannot be pivoted downwards fully to reduce the overall volume of the LCD monitor. Thus, the LCD monitor occupies a large volume, which causes the storage and transportation of the LCD monitor to be inconvenient and uneconomical.

Therefore, the invention provides an improved stand for an LCD monitor to mitigate and/or obviate the aforementioned problems.

SUMMARY OF THE INVENTION

The main objective of the invention is to provide a stand for an LCD monitor that can be folded to reduce the overall volume of the monitor for packaging or storage.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
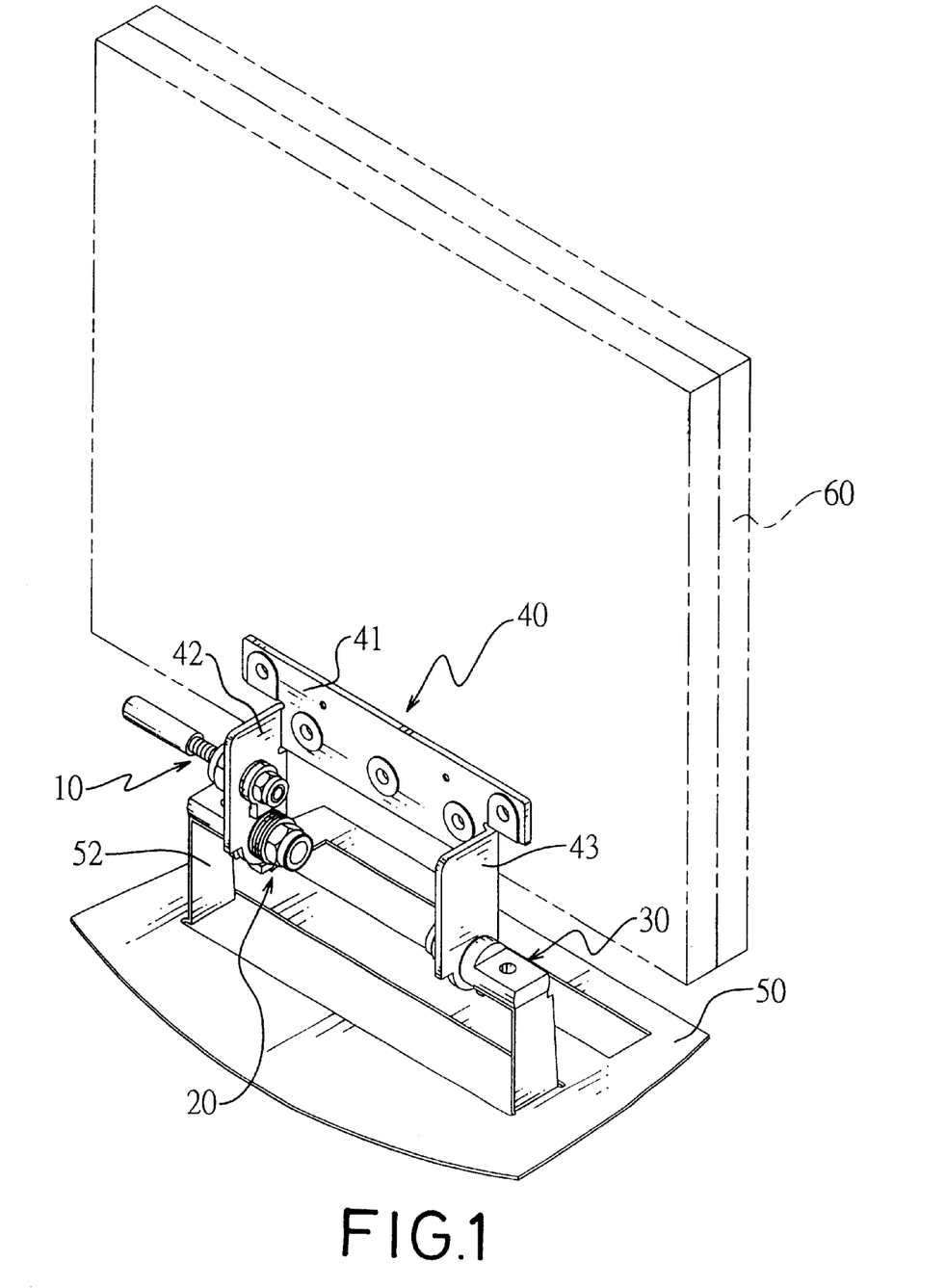
FIG. 1 is a perspective view of a stand in accordance with the present invention attached to an LCD monitor.
Figure 2:
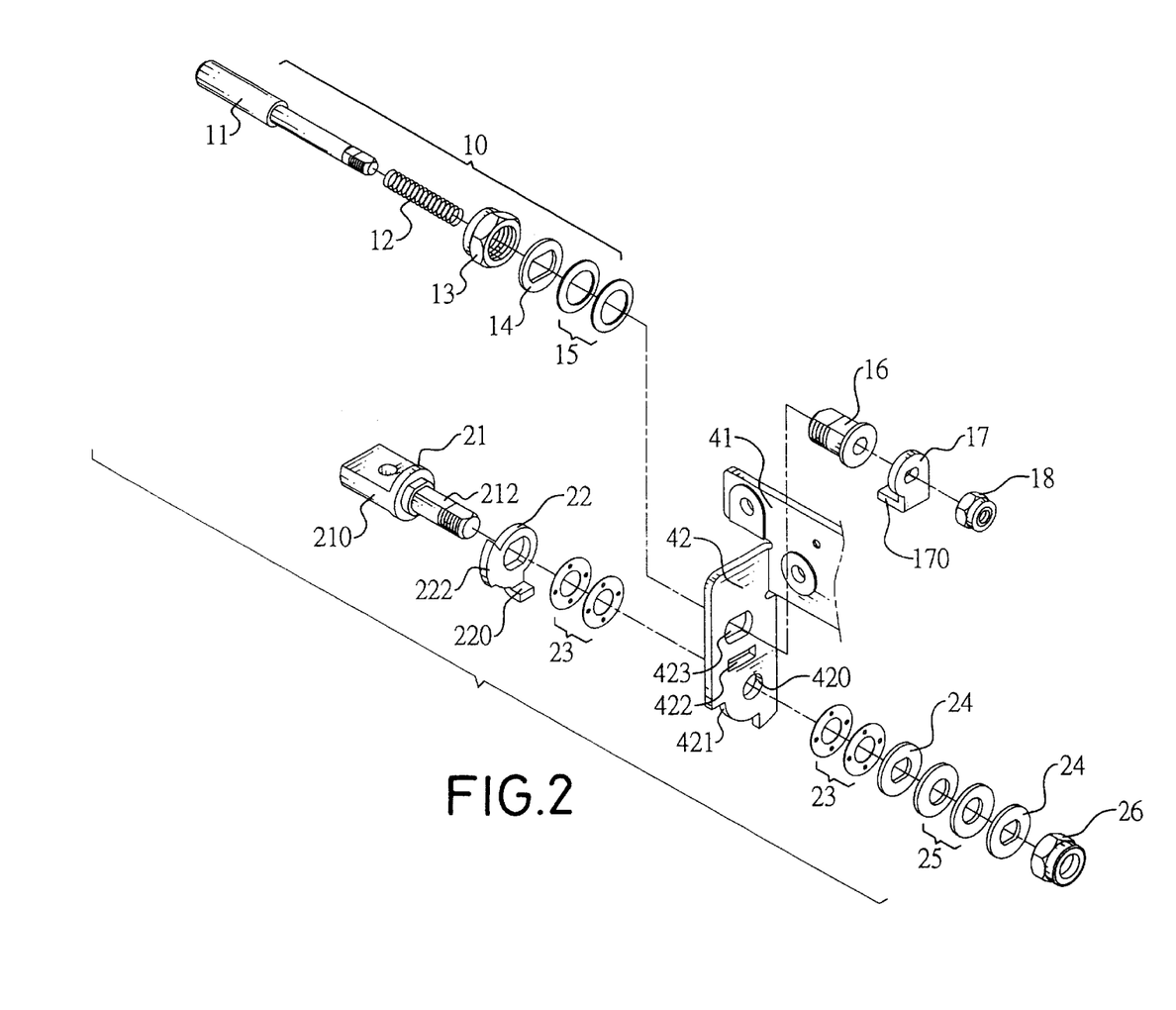
FIG. 2 is an exploded perspective view of a left part of the stand in FIG. 1.
Figure 3:
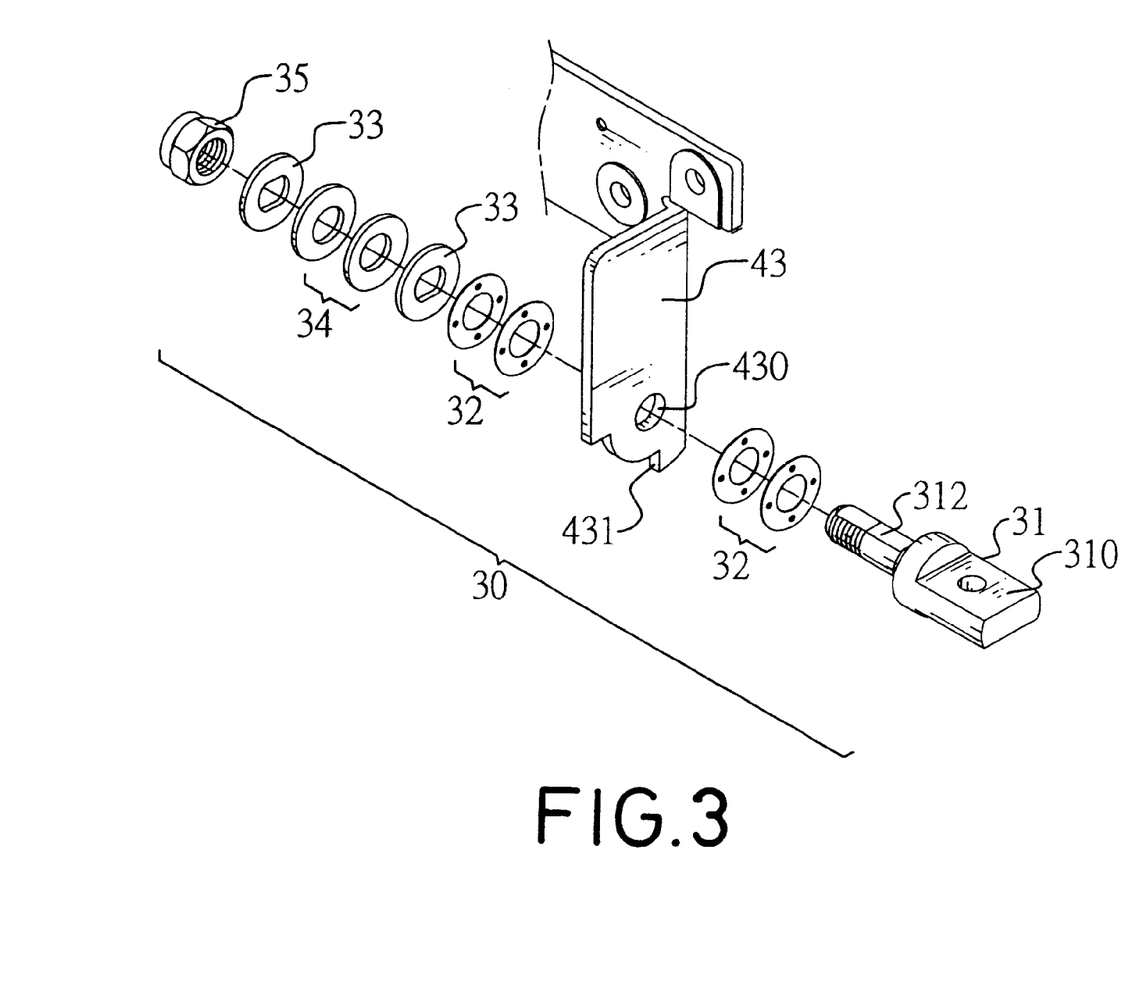
FIG. 3 is an exploded perspective view of a right part of the stand in FIG. 1.

With reference to FIGS. 1–3, a stand in accordance with the present invention attached to an LCD monitor (60) is composed of a locking member (10), a first pivoting member (20), a second pivoting member (30), a monitor bracket (40), and a base (50). The LCD monitor (60) has a back, a top and a bottom.

The monitor bracket (40) comprises a bar (41), a first ear (42) and a second ear (43). The bar (41) is essentially rectangular and flat with two ends and is firmly attached to the back of the LCD monitor (60). The ears (42, 43) are respectively formed perpendicular to opposite ends of the bar (41) and parallel to each other and have an exterior side, an interior side, a top and a bottom.

The first ear (42) has a first arcuate notch (421), a first pivot hole (420), a slot (422) and a keyed hole (423). The first arcuate notch (421) is defined at the bottom of the first ear (42). In this embodiment, the first arcuate notch (421) has a radial angle of substantially ninety degrees and has a vertical limit and a horizontal limit at opposite ends of the arcuate notch (421). The first pivot hole (420) is define coaxial to the first arcuate notch (421) through the first ear (42). The slot (422) is defined above the first pivot hole (420), and the keyed hole (423) is defined above the slot (422).

The second ear (43) has a second arcuate notch (431) and a second pivot hole (430). The second arcuate notch (431) is defined at the bottom of the second ear (43). The second pivot hole (430) is defined coaxial with the arcuate notch (431) through the second ear (43) and aligned with the first pivot hole (420).

The first pivoting member (20) is pivotally mounted on the first ear (42). The first pivoting member (20) has a first pivot pin (21), a positioning disk (22), a first nut (26), a first damper (25), two first flat washers (24) and two pairs of first gaskets (23). The first pivot pin (21) has two ends, a first enlarged head (210), a first keyed shaft (212) and a first transverse flange (not number) between the enlarged head (210) and the keyed shaft (212). The keyed shaft (212) has an external thread (not numbered) and extends through the first pivot hole (420) from the exterior side of the first ear (42).

The positioning disk (22) has a bottom, a lug (220), a limit (222), an irregular outer circumference and a keyed central hole (not numbered). The positioning disk (22) is mounted around the first keyed shaft (212) of the first pivot pin (21) between the first transverse flange and the first ear (42). The lug (220) is formed at the bottom of the outer circumference of the positioning disk (22) and extends into the first arcuate notch (421). When the first pivot pin (21) is turned, the lug (220) is blocked by the limits of the first arcuate notch (421). The limit (222) is formed at the outer circumference of the positioning disk (22).

The first nut (26) is screwed onto the first keyed shaft (212) to fasten the first pivot pin (21) in the first pivot hole (420). The first damper (25) includes at least two resilient dished washers (not numbered) and is mounted around the first keyed shaft (212) between the first nut (26) and the first ear (42). The first flat washers (24) are respectively mounted around the first keyed shaft (212) at two sides of the first damper (25). The two pairs of first gaskets (23) are respectively mounted around the first keyed shaft (212) at the exterior and interior sides of the first ear (42). The pair of gaskets (23) at the exterior side is between the positioning disk (22) and the first ear (42), and the other pair of gaskets (23) at the interior side is between the first ear (42) and one of the first flat washers (24).

The second pivoting member (30) is pivotally mounted on the second ear (43) and is fundamentally the same as the first pivoting member (20) with the exception of the positioning disk (22). The second pivoting member (30) has a second pivot pin (31), a second nut (35), a second damper (34), two second flat washers (33) and two pairs of second gaskets (32). The second pivot pin (31) has two ends, a second enlarged head (310), a second keyed shaft (312) and a second transverse flange (not number) between the enlarged head (310) and the keyed shaft (312). The keyed shaft (312) has an external thread (not numbered) and extends through the second pivot hole (430) from the exterior side of the second ear (43).

The second nut (35) is screwed onto the second keyed shaft (312) to fasten the second pivot pin (31) in the second pivot hole (430). The second damper (34) including at least two resilient dished washers (not numbered) is mounted around the second keyed shaft (312) between the second nut (35) and the second ear (43). The second flat washers (33) are respectively mounted around the second keyed shaft (312) at two sides of the second damper (34). The two pairs of second gaskets (32) are respectively mounted around the second keyed shaft (312) at the exterior side and the interior side of the second ear (43). The pair of gaskets (32) at the exterior side is between the second transverse flange and the second ear (43), and the other pair of gaskets (32) at the interior side is between the second ear (43) and one of the second flat washers (24).

The locking member (10) is mounted on the first ear (42) and comprises a rod (11), a sleeve (16), a third nut (13), a fourth nut (18), a keyed latch (17), a biasing member (12), a third damper (15) and a third flat washer (14). The rod (11) has two ends and is composed of a first part (not numbered) with a large outer diameter at one end and a second part (not numbered) with a small outer diameter at the other end. An exterior thread and a keyed surface are formed at the small end of the rod (11). The sleeve (16) has an outer surface, two ends, an enlarged flange on one end, an outer thread at the other end and a longitudinal keyed surface on the outer surface. The sleeve (16) is mounted in the keyed hole (423) in the first ear (42) from the interior side of the first ear (42). The third nut (13) screws onto the sleeve (16) at the exterior side of the first ear (42) to hold the sleeve (16) in the keyed hole (423).

The second part of the rod (11) extends through the sleeve (16) from the exterior side of the first ear (42). The fourth nut (18) is screwed onto the end of the second part of the rod (11). The keyed latch (17) is mounted on the keyed surface at the small end of the rod (11) between the sleeve (16) and the fourth nut (18). The keyed latch (17) has a bottom, and a tongue (170) with an essentially square leading edge (not numbered) is formed at the bottom of the keyed latch (17) and is mounted in and extends through the slot (422) in the first ear (42) over the positioning disk (22). The biasing member (12) is mounted around second part of the rod (11) between the first part and the third nut (13). The third damper (15) including at least two resilient dished washers and the third flat washer (14) are in turn mounted around the sleeve (16) between the first ear (42) and the third nut (13).

The base (50) has two base brackets (52) formed upright on the base (50). The enlarged heads (210, 310) of the pivoting members (20, 30) are respectively attached to the brackets (52). Then, the monitor bracket (40) can be pivoted about the pivot pins (21, 31) secured on the brackets (52) for adjusting the LCD monitor (60).

Figure 4:
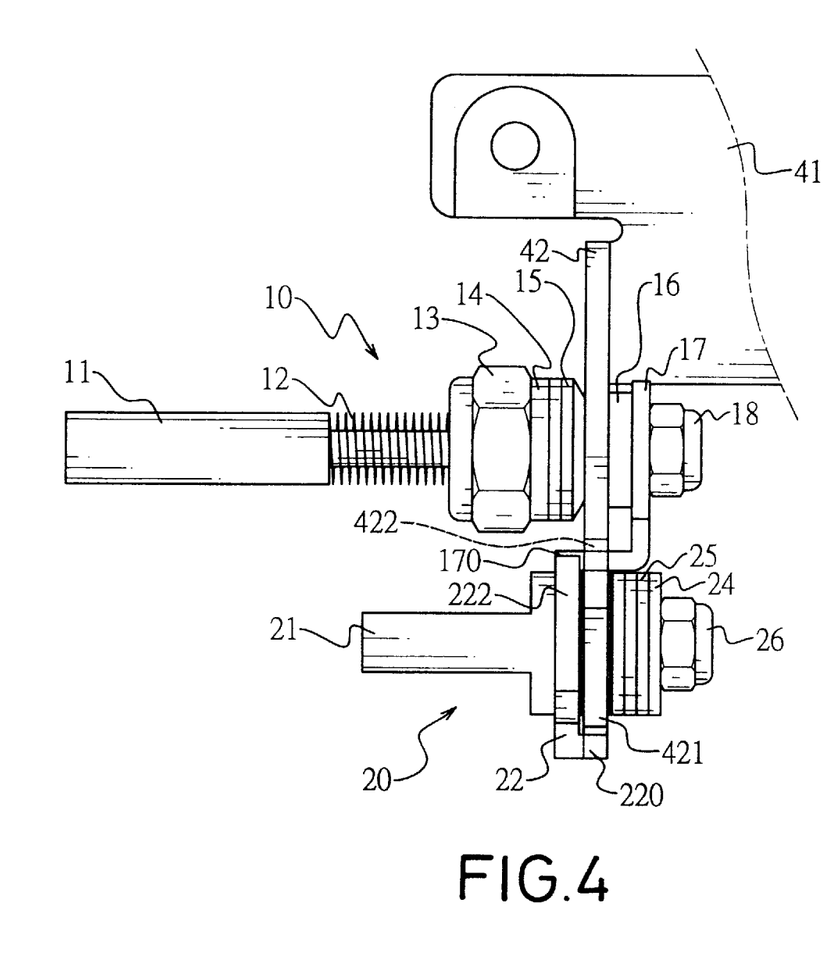
FIG. 4 is a partial rear view of the stand in FIG. 1 showing a first pivoting member and a positioning member in a locked status.
Figure 6:
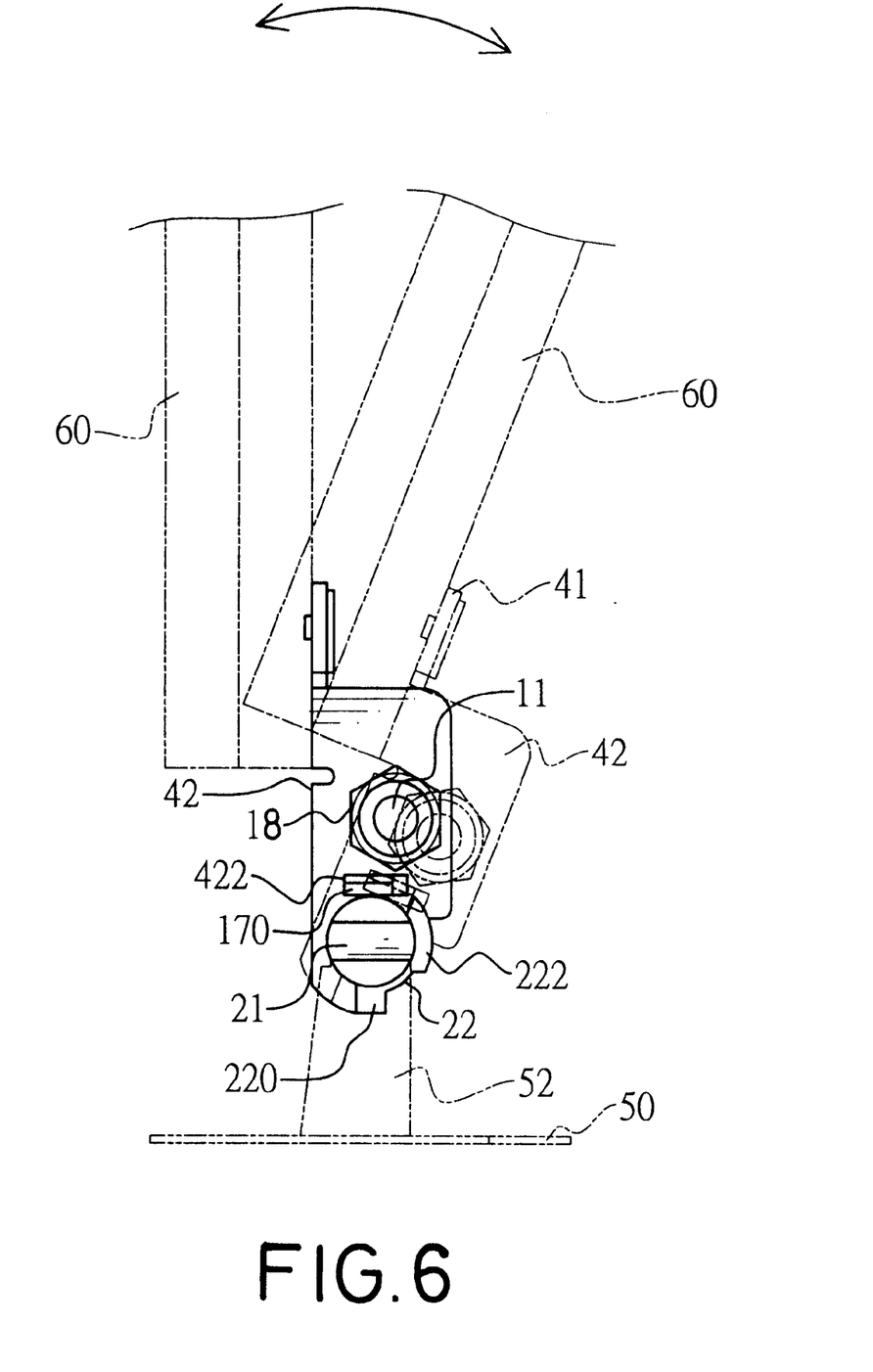
FIG. 6 is an operational left side view of the LCD monitor adjusted by using the stand in FIG. 1.

With reference to FIGS. 4 and 6, the biasing member (12) presses against the large part of the rod (11), which draws the tongue (170) of the latch (17) through the slot (422) and over the positioning disk (22). When the tongue (170) of the latch (17) abuts the limit (222) on the positioning disk (22), the monitor bracket (40) cannot be pivoted further, so that the LCD monitor (60) is adjustable in the range from the vertical limit on the first ear (42) to the limit (222) on the positioning disk (22).

Figure 5:
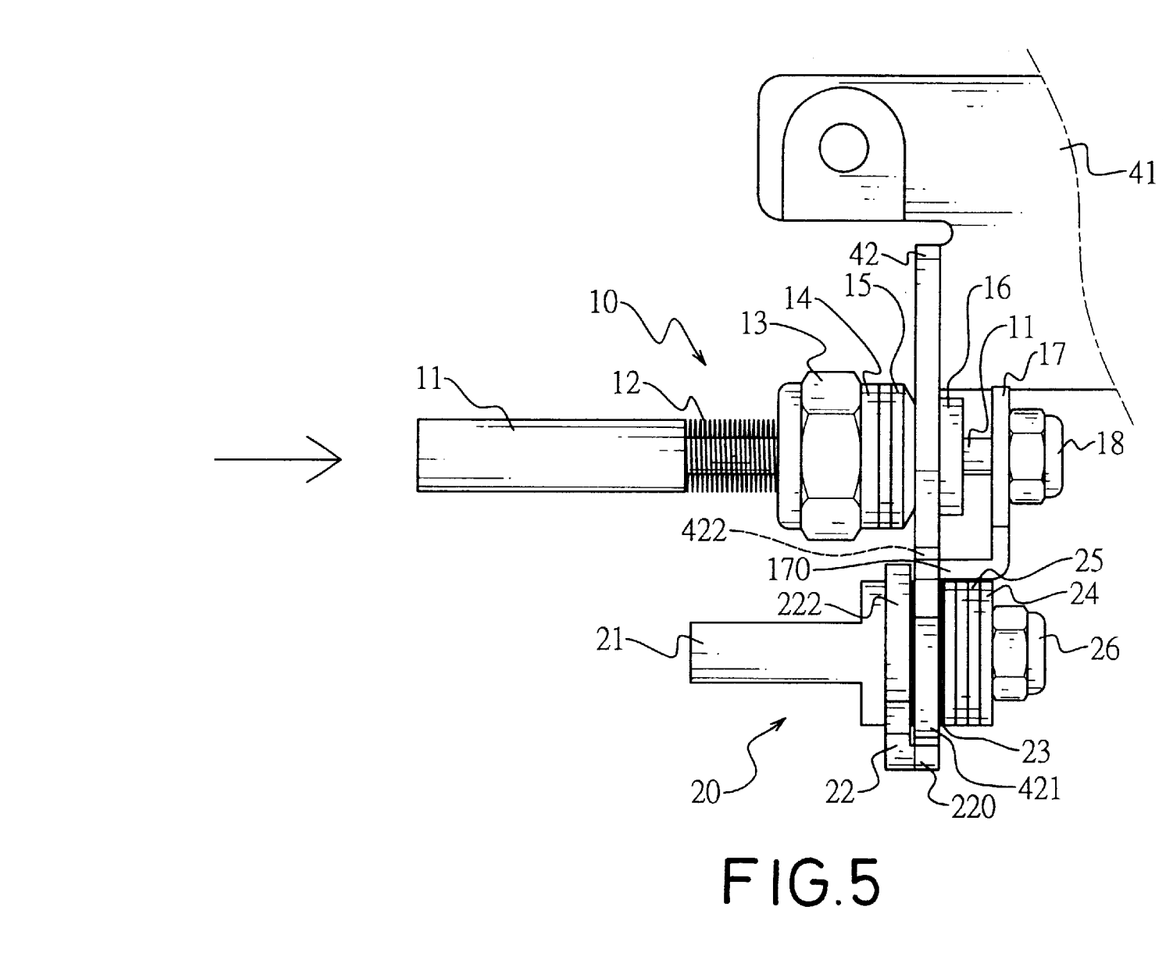
FIG. 5 is a partial rear view of the stand in FIG. 1 showing the first pivoting member and the positioning member in an unlocked status.
Figure 7:
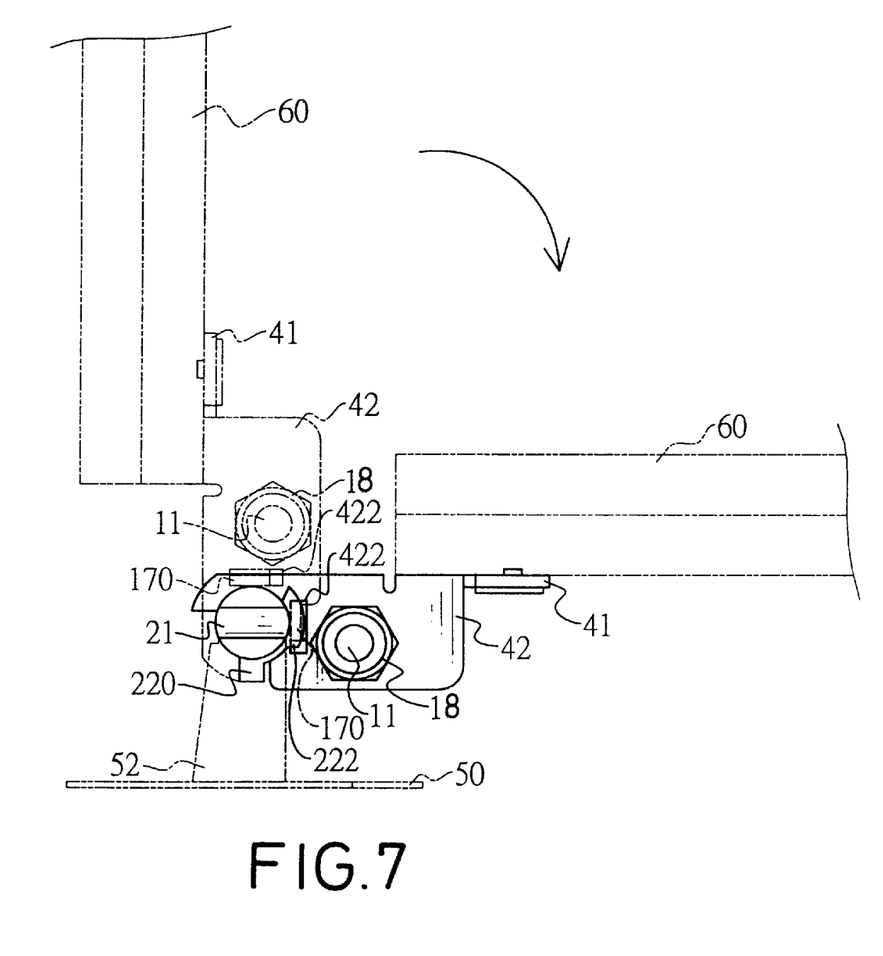
FIG. 7 is an operational left side view of the LCD and stand in FIG. 6 folded completely.

With reference to FIGS. 5 and 7, the tongue (170) is retracted from the slot (422) when large part of the rod (11) is pressed towards the first ear (42), which releases the limit (222) on the positioning disk (22). Then, the monitor bracket (40) and the LCD monitor (60) can be fully pivoted to a horizontal position until the lug (220) abuts the horizontal limit of the arcuate notch (421).

Figure 8:
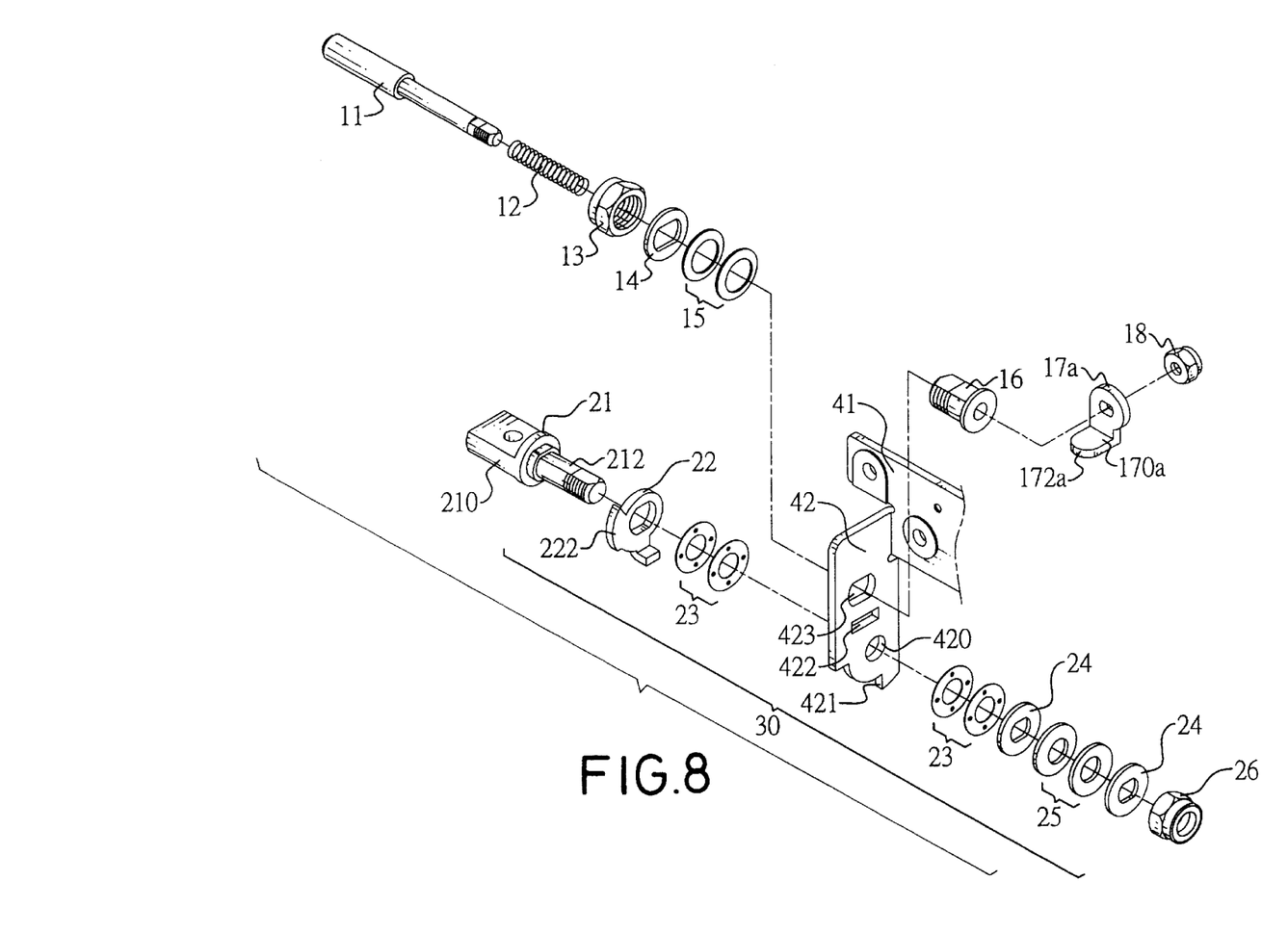
FIG. 8 is an exploded perspective view of a left part of another embodiment of the stand in accordance with the invention.
Figure 9:
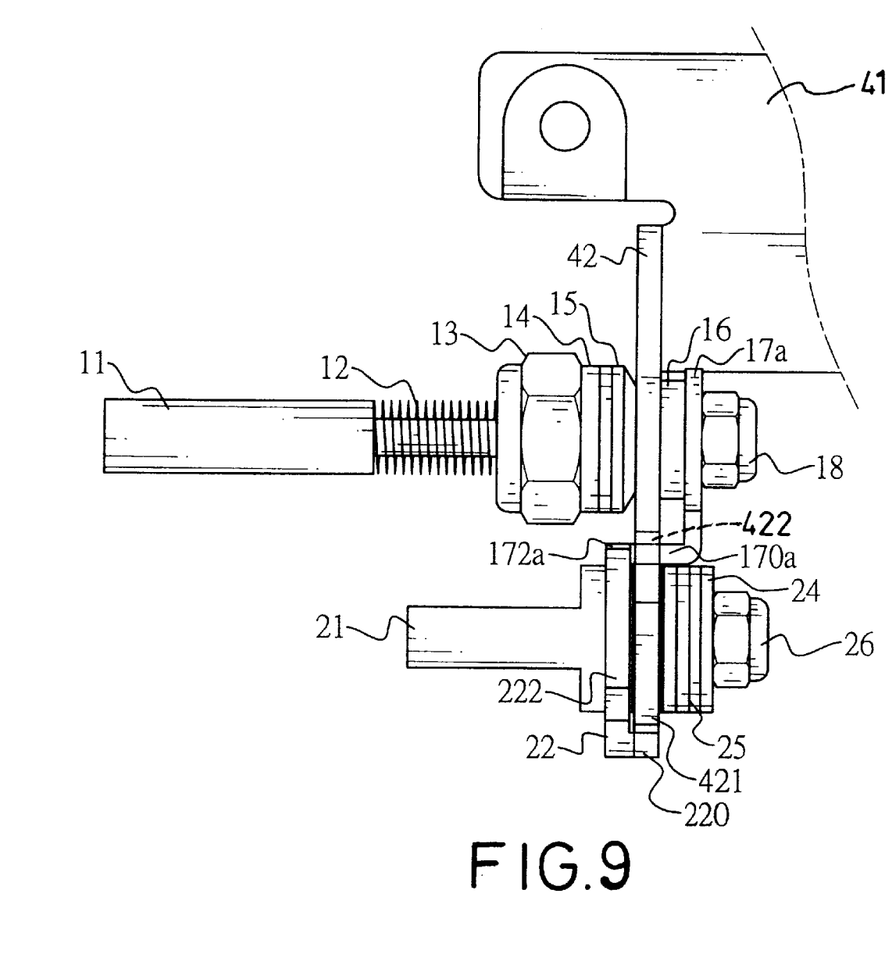
FIG. 9 is a partial rear view of the stand in FIG. 8 showing the first pivoting member and the positioning member in a locked status.
Figure 10:
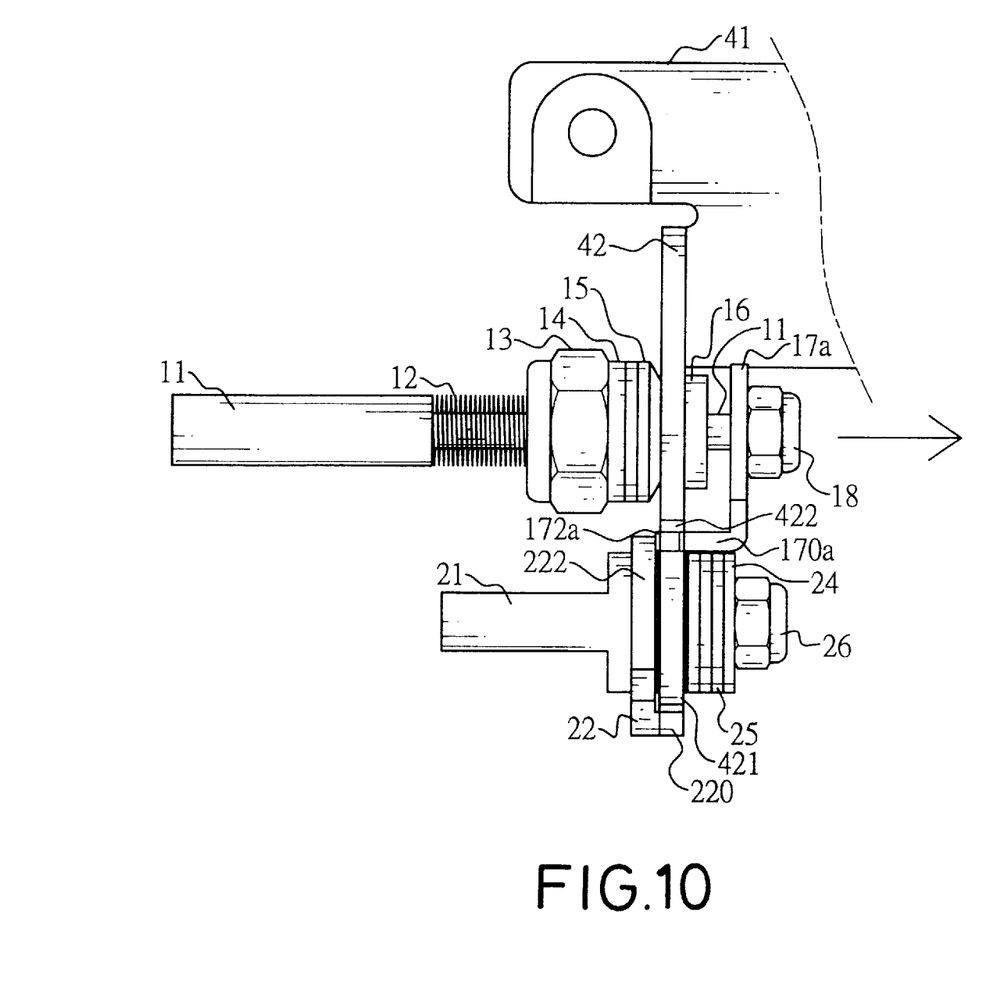
FIG. 10 is a partial rear view of the stand in FIG. 8 showing the first pivoting member and the positioning member in an unlocked status.

With reference to FIGS. 8–10, a second embodiment of the stand in accordance with the present invention has the same elements as the previously described stand except the tongue (170a) on the latch (17a) is slightly modified. The modified tongue (170a) on the latch (17a) has an arced edge (172a).

When the limit (222) of the positioning disk (22) abuts the arced edge (172) of the tongue (170a), the application of an additional force on the monitor bracket (40) as well as the LCD monitor will cause the limit (222) to slide along the arced edge (172) and push the tongue (170a) out from the slot (422). When the tongue (170a) disengages from the limit (222), the LCD monitor can be folded to a horizontal position without pressing the rod (11).

According to the present invention, the monitor bracket of the stand can be fully pivoted to reduce the overall volume of the LCD monitor, which makes packing, storing and transporting the LCD monitor very convenient.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stand for an LCD monitor comprising:
  a monitor bracket (40) adapted to be connected to the back of an LCD monitor, the monitor bracket (40) having
    a bar (41) with two ends for attaching the stand to the LCD monitor;
    a first ear (42) with a bottom and a top formed perpendicular to the bar (41) at one end of the bar (41);
      wherein the first ear (42) has an arcuate notch (421) defined at the bottom of the first ear (42), a first pivot hole (420) defined substantially concentric with the arcuate notch (421) through the first ear (42), a slot (422) defined above the first pivot hole (420) and a keyed hole (423) defined above the slot (422); and
    a second ear (43) with a bottom and a top formed perpendicular to the bar (41) at the other end of the bar (41);
      wherein the second ear (43) has a second pivot hole (430) defined through the second ear (43) and aligned with the first pivot hole (420);
  a first pivoting member (20) pivotally mounted on the first ear (42), the first pivoting member (20) having a first pivot pin (21) with two ends, a first enlarged head (210), a first keyed shaft (212) and a first transverse flange between the first enlarged head (210) and the first keyed shaft (212), the first keyed shaft (212) having an external thread and extending through the first pivot hole (420);

a first nut (26) screwed onto the external thread of the first keyed shaft (212);

a positioning disk (22) with a bottom mounted around the first keyed shaft (212) between the first ear (42) and the first transverse flange of the first pivot pin (21), the positioning disk (22) having an irregular outer circumference, a lug (220) formed at the bottom of the outer circumference and extending into the arcuate notch (421) on the first ear (42), a keyed central hole and a limit (222) formed on the outer circumference of the positioning disk (22);

a first damper (25) mounted around the first keyed shaft (212) between the first ear (42) and the first nut (26);

two first flat washers (24) respectively mounted around the keyed shaft (212) at two sides of the first damper (25); and two pairs of first gaskets (23) respectively mounted around the keyed shaft (212) at two sides of the first ear (42);

a second pivoting member (30) pivotally mounted on the second ear (43), the second pivoting member (30) having a second pivot pin (31) with two ends, a second enlarged head (310) formed at one end, a second keyed shaft (312) formed at the other end with an external thread and a second transverse flange between the second enlarged head (310) and the second keyed shaft (312), the second keyed shaft (312) extending through the second pivot hole (430);

a second nut (35) screwed onto the external thread of the second keyed shaft (312);

a second damper (34) mounted around the second keyed shaft (312) between the second ear (43) and the second nut (35);

two second flat washers (33) respectively mounted around the keyed shaft (312) at two sides of the second damper (34); and two pairs of second gaskets (32) respectively mounted around the keyed shaft (312) at two sides of the second ear (43);

a locking member (10) mounted on the first ear (42), the locking member (10) having a sleeve (16) having an outer surface, two ends, an enlarged flange on one end, an outer thread at the other end and a longitudinal keyed surface on the outer surface mounting in and extending through the keyed hole (423) in the first ear (42);

a third nut (13) screws onto the outer thread of the sleeve (16) to hold the sleeve (16) in the keyed hole (423);

a rod (11) with two ends composed of a first part with a large outer diameter at one end and a second part with a small outer diameter at the other end, the second part of the rod (11) having an external thread and a keyed surface extending through the sleeve (16);

a fourth nut (18) screws onto the external thread of the second part of the rod (11);

a latch (17) mounted around the rod (11) between the sleeve (16) and the fourth nut (18), the latch (17) having a bottom edge and a tongue (170) formed at the bottom edge of the latch (17) and extending through the slot (422) in the first ear (42) and over the positioning disk (22);

a biasing member (12) mounted around the second part of the rod (11) between the first part of the rod (11) and the third nut (13);

a third damper (15) mounted around the rod (11) between the first ear (42) and the third nut (13); and a third flat washer (14) mounted around the rod (11) between the third nut (13) and the third damper (15); and a base (50) with two brackets (52) formed upright on the base (50) to which enlarged heads (210, 310) of the pivoting members (20, 30) are securely attached.

2. The stand as claimed in claim 1, wherein the tongue (170a) of the latch (17a) further has an arced edge (172a).

3. The stand as claimed in claim 1, wherein each of the dampers (25, 34, 15) includes at least two resilient dished washers.

4. The stand as claimed in claim 1, wherein the arcuate notch (421) has a radius angle of substantially ninety degrees.

5. The stand as claimed in claim 1, wherein the arcuate notch (421) has a horizontal limit and a vertical limit.

* * * * *